(12) United States Patent
Hovakymian et al.

(10) Patent No.: US 12,020,438 B2
(45) Date of Patent: *Jun. 25, 2024

(54) AGRICULTURAL PATTERNS ANALYSIS SYSTEM

(71) Applicant: Intelinair, Inc., Champaign, IL (US)

(72) Inventors: Naira Hovakymian, Champaign, IL (US); Hrant Khachatrian, Yerevan (AM); Karen Ghandilyan, Champaign, IL (US)

(73) Assignee: Sentinel Connector Systems, Inc., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,152

(22) Filed: Feb. 8, 2023

(65) Prior Publication Data

US 2023/0186481 A1 Jun. 15, 2023

Related U.S. Application Data

(63) Continuation of application No. 16/692,779, filed on Nov. 22, 2019, now Pat. No. 11,580,729.

(Continued)

(51) Int. Cl.
*G06T 7/11* (2017.01)
*A01B 79/00* (2006.01)
*G01C 11/02* (2006.01)
*G01J 3/28* (2006.01)
*G06V 10/42* (2022.01)

(Continued)

(52) U.S. Cl.
CPC ............. *G06T 7/11* (2017.01); *A01B 79/005* (2013.01); *G01C 11/02* (2013.01); *G01J 3/2823* (2013.01); *G06V 10/431* (2022.01); *G06V 10/454* (2022.01); *G06V 10/764* (2022.01); *G06V 10/82* (2022.01); *G06V 20/188* (2022.01);

(Continued)

(58) Field of Classification Search
CPC ............. G06T 7/11; G06T 2207/30188; G06T 2207/10024; G06T 2207/10032; G06T 2207/10048; G06T 2207/20021; G06T 2207/20056; G06T 2207/20084; A01B 79/005; G01C 11/02; G01J 3/2823; G01J 2003/2826; G01J 2003/283; G01J 2003/284; G06V 10/454; G06V 10/764; G06V 10/82; G06V 20/188; G06V 20/194; G06V 10/431

See application file for complete search history.

(56) References Cited

U.S. PATENT DOCUMENTS

2003/0095715 A1* 5/2003 Avinash ................... G06T 5/50
382/300
2018/0108137 A1* 4/2018 Price ........................ G06N 3/08

FOREIGN PATENT DOCUMENTS

JP 2018066616 * 4/2018 ............. G01N 33/24

* cited by examiner

*Primary Examiner* — Siamak Harandi
(74) *Attorney, Agent, or Firm* — KCO Legal, Inc.

(57) ABSTRACT

A pattern recognition system including an image gathering unit that gathers at least one digital representation of a field, an image analysis unit that pre-processes the at least one digital representation of a field, an annotation unit that provides a visualization of at least one channel for each of the at least one digital representation of the field, where the image analysis unit generates a plurality of image samples from each of the at least one digital representation of the field, and the image analysis unit splits each of the image samples into a plurality of categories.

20 Claims, 4 Drawing Sheets

Related U.S. Application Data

(60) Provisional application No. 62/768,877, filed on Nov. 17, 2018.

(51) Int. Cl.
  *G06V 10/44* (2022.01)
  *G06V 10/764* (2022.01)
  *G06V 10/82* (2022.01)
  *G06V 20/10* (2022.01)

(52) U.S. Cl.
  CPC .................. *G01J 2003/2826* (2013.01); *G06T 2207/30188* (2013.01); *G06V 20/194* (2022.01)

AGRICULTURAL PATTERNS ANALYSIS SYSTEM

CROSS REFERENCE TO RELATED APPLICATIONS

This application is a non-provisional patent application that claims the benefit of and the priority from U.S. Non Provisional application Ser. No. 16/692,779 filed Nov. 22, 2019, which claims priority to U.S. Provisional Patent Application No. 62/768,877, filed Nov. 24, 2018, titled "AgimageNet: a Large-scale Agricultural Aerial Image Database for Visual Pattern Recognition and a Pilot Study."

BACKGROUND OF THE INVENTION

The agriculture industry comprises a large portion of the world's economy. In addition, as the population of the world increases annually, more food must be produced by existing agricultural assets. In order to increase yields on existing plots of farm land, producers require a clear understanding of plant and soil conditions. However, as a single farm may encompass hundreds of acres, it is difficult to access the conditions of the farmland.

Currently, farmers rely on their observations of their land along with prior experience to determine the requirements to increase the yield of their farm land. These observations may include identifying locations of weeds, identifying plant illnesses and determining levels of crop damage. However, considering the large number of acres in the average farm, these observations are not a reliable method to increase yields. Therefore, a need exists for system that will allow a farmer to better understand the conditions of their farmland.

SUMMARY OF THE INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

One embodiment of the present disclosure includes a pattern recognition system including an image gathering unit that gathers at least one digital representation of a field, an image analysis unit that pre-processes the at least one digital representation of a field, an annotation unit that provides a visualization of at least one channel for each of the at least one digital representation of the field, where the image analysis unit generates a plurality of image samples from each of the at least one digital representation of the field, and the image analysis unit splits each of the image samples into a plurality of categories.

In another embodiment, the annotation unit separates each digital representation into RGB, NIR and NDVI channels.

In another embodiment, the each of the samples is 512 pixels by 512 pixels.

In another embodiment, the samples are compared for overlap.

In another embodiment, a sample having fewer pixels is discarded if the sample has more than 30% overlap with an adjacent sample.

In another embodiment, the image analysis unit randomly splits each sample into at least three categories.

In another embodiment, the image analysis unit generates a semantic map by applying a modified FPN model to each image sample.

In another embodiment, the FPN model encoder is a ResNet.

In another embodiment, the FPN decoder includes two 3×3 and one 1×1 convolution layer.

In another embodiment, each 3×3 convolution layer includes batch normalization layer and a leaky ReLU layer.

Another embodiment of the present disclosure includes a method of recognizing a pattern in an image by an image recognition unit including a processor and a memory, with a program in the memory executing the steps of gathering at least one digital representation of a field, pre-processing the at least one representation of a field, providing a visualization of at least one channel for each of the at least one digital representation of the field, generating a plurality of image samples from each of the at least one digital representation of the field, and splitting each of the image samples into a plurality of categories.

Another embodiment includes the step of separating each digital representation into RGB, NIR and NDVI channels.

In another embodiment, each of the samples is 512 pixels by 512 pixels.

In another embodiment, adjacent samples are compared for overlap.

In another embodiment, a sample having fewer pixels is discarded if the sample has more than 30% overlap with an adjacent sample.

Another embodiment includes the step of randomly splitting each sample into at least three categories.

Another embodiment includes the step of generating a semantic map by applying a modified FPN model to each image sample.

In another embodiment, the FPN model encoder is a ResNet.

In another embodiment, the FPN decoder includes two 3×3 and one 1×1 convolution layer.

In another embodiment, each 3×3 convolution layer includes batch normalization layer and a leaky ReLU layer.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figure 1:
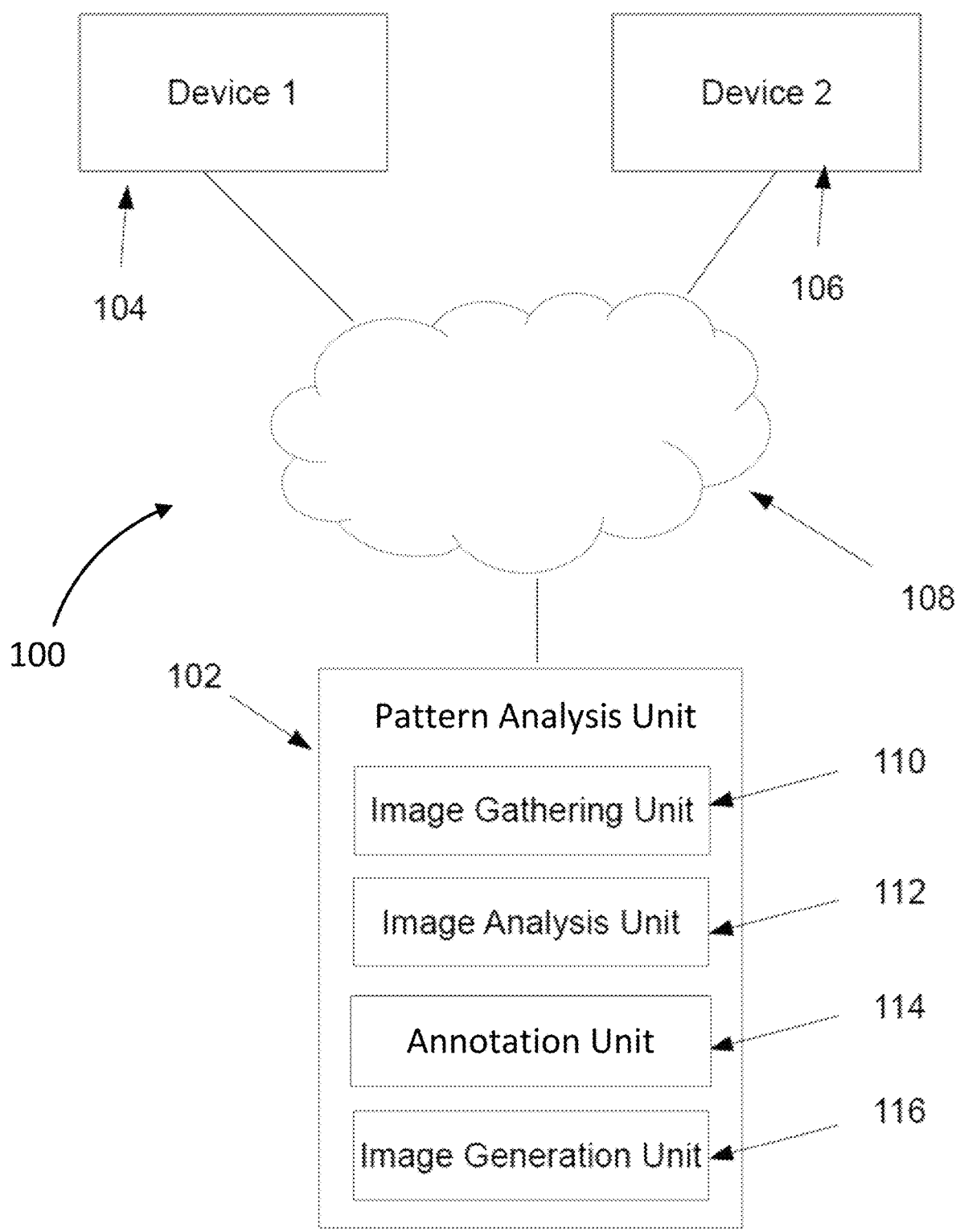
FIG. 1 depicts one embodiment of a row identification system consistent with the present invention.

Referring now to the drawings which depict different embodiments consistent with the present invention, wherever possible, the same reference numbers will be used throughout the drawings and the following description to refer to the same or like parts.

The row identification system 100 gathers medium to low resolution images gathered from an aircraft flying above 1,500 feet. Each image is then partitioned into equally sized tiles. Each tile is analyzed to identify objects within the tile. Adjacent tiles are then compared to identify similar objects in adjacent tiles. When the system 100 identifies an object that is inconsistent with adjacent objects, the system 100 identifies the area in the image containing the inconsistent object as an area requiring further statistical analysis. By comparing object areas to adjacent object areas to identify similar objects and dissimilar objects, the processing of large images covering multiple acres can be performed using less processing resources resulting in more images being processed and fewer images being gathered to analyze multiple acres of land.

FIG. 1 depicts one embodiment of a pattern analysis system 100 consistent with the present invention. The pattern analysis system 100 includes a row identification device 102, a communication device 1 104, a communication device 2 106 each communicatively connected via a network 108. The pattern analysis 100 further includes an image gathering unit 110, an image analysis unit 112, an annotation unit 114 and an image generation unit 116.

The image gathering unit 110 and image analysis unit 112 may be embodied by one or more servers. Alternatively, each of the annotation unit 114 and image generation unit 116 may be implemented using any combination of hardware and software, whether as incorporated in a single device or as a functionally distributed across multiple platforms and devices.

In one embodiment, the network 108 is a cellular network, a TCP/IP network, or any other suitable network topology. In another embodiment, the row identification device may be servers, workstations, network appliances or any other suitable data storage devices. In another embodiment, the communication devices 104 and 106 may be any combination of cellular phones, telephones, personal data assistants, or any other suitable communication devices. In one embodiment, the network 102 may be any private or public communication network known to one skilled in the art such as a local area network ("LAN"), wide area network ("WAN"), peer-to-peer network, cellular network or any suitable network, using standard communication protocols. The network 108 may include hardwired as well as wireless branches. The image gathering unit 112 may be a digital camera.

Figure 2:
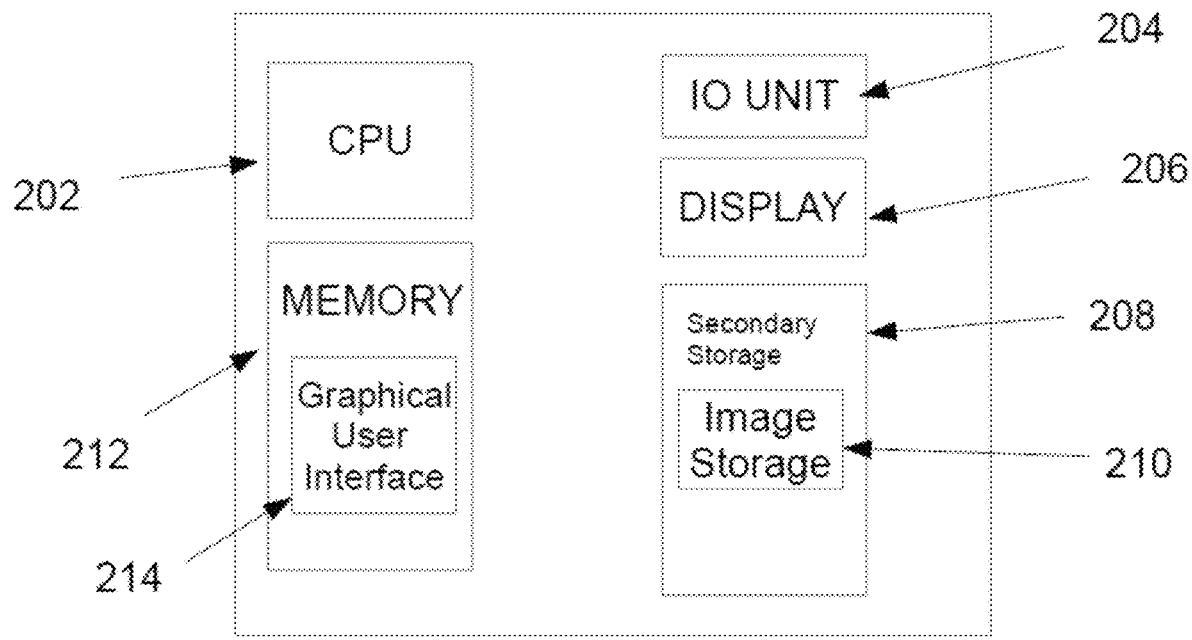
FIG. 2 depicts one embodiment of a row detection unit.

FIG. 2 depicts one embodiment of a row detection unit 102. The row identification device 102 includes a network I/O device 204, a processor 202, a display 206 and a secondary storage 208 running image storage unit 210 and a memory 212 running a graphical user interface 214. The image gathering unit 112, operating in memory 208 of the row detection unit 102, is operatively configured to receive an image from the network I/O device 204. In one embodiment, the processor 202 may be a central processing unit ("CPU"), an application specific integrated circuit ("ASIC"), a microprocessor or any other suitable processing device. The memory 212 may include a hard disk, random access memory, cache, removable media drive, mass storage or configuration suitable as storage for data, instructions, and information. In one embodiment, the memory 208 and processor 202 may be integrated. The memory may use any type of volatile or non-volatile storage techniques and mediums. The network I/O line 204 device may be a network interface card, a cellular interface card, a plain old telephone service ("POTS") interface card, an ASCII interface card, or any other suitable network interface device. The row detection unit 114 may be a compiled program running on a server, a process running on a microprocessor or any other suitable port control software.

Figure 3:
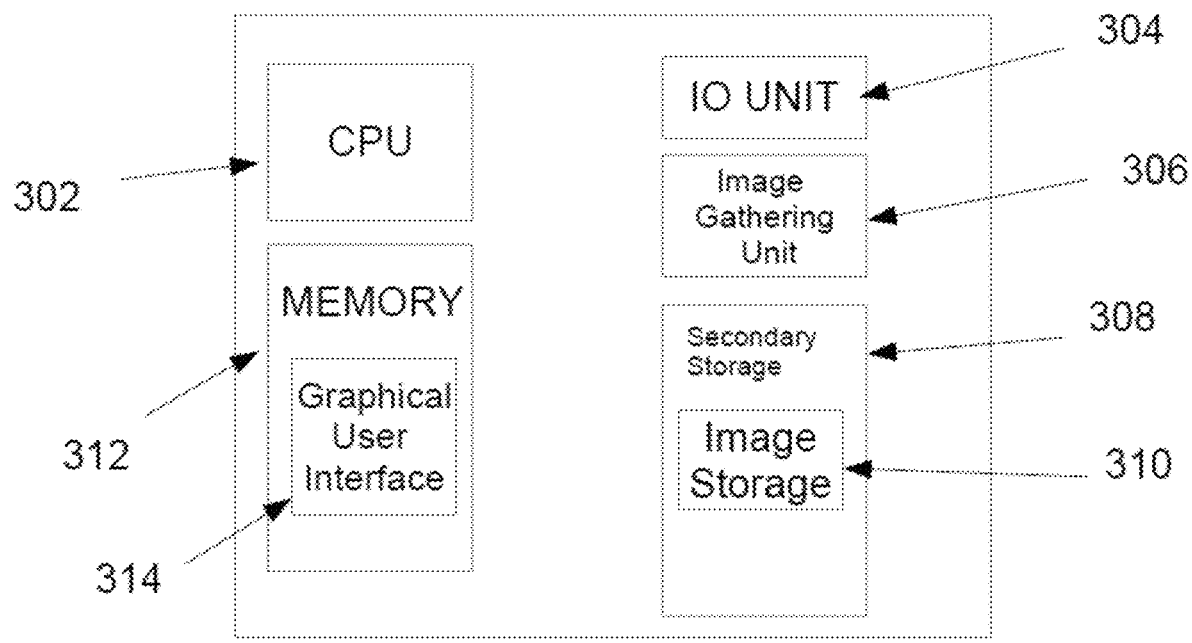
FIG. 3 depicts one embodiment of a communication device consistent with the present invention.

FIG. 3 depicts one embodiment of a communication device 104/106 consistent with the present invention. The communication device 104/1106 includes a processor 302, a network I/O Unit 304, an image capture unit 306, a secondary storage unit 308 including an image storage device 310, and memory 312 running a graphical user interface 314. In one embodiment, the processor 302 may be a central processing unit ("CPU"), an application specific integrated circuit ("ASIC"), a microprocessor or any other suitable processing device. The memory 312 may include a hard disk, random access memory, cache, removable media drive, mass storage or configuration suitable as storage for data, instructions, and information. In one embodiment, the memory 312 and processor 302 may be integrated. The memory may use any type of volatile or non-volatile storage techniques and mediums. The network I/O device 304 may be a network interface card, a plain old telephone service ("POTS") interface card, an ASCII interface card, or any other suitable network interface device.

In one embodiment, the network 108 may be any private or public communication network known to one skilled in the art such as a Local Area Network ("LAN"), Wide Area Network ("WAN"), Peer-to-Peer Network, Cellular network or any suitable network, using standard communication protocols. The network 108 may include hardwired as well as wireless branches.

Figure 4:
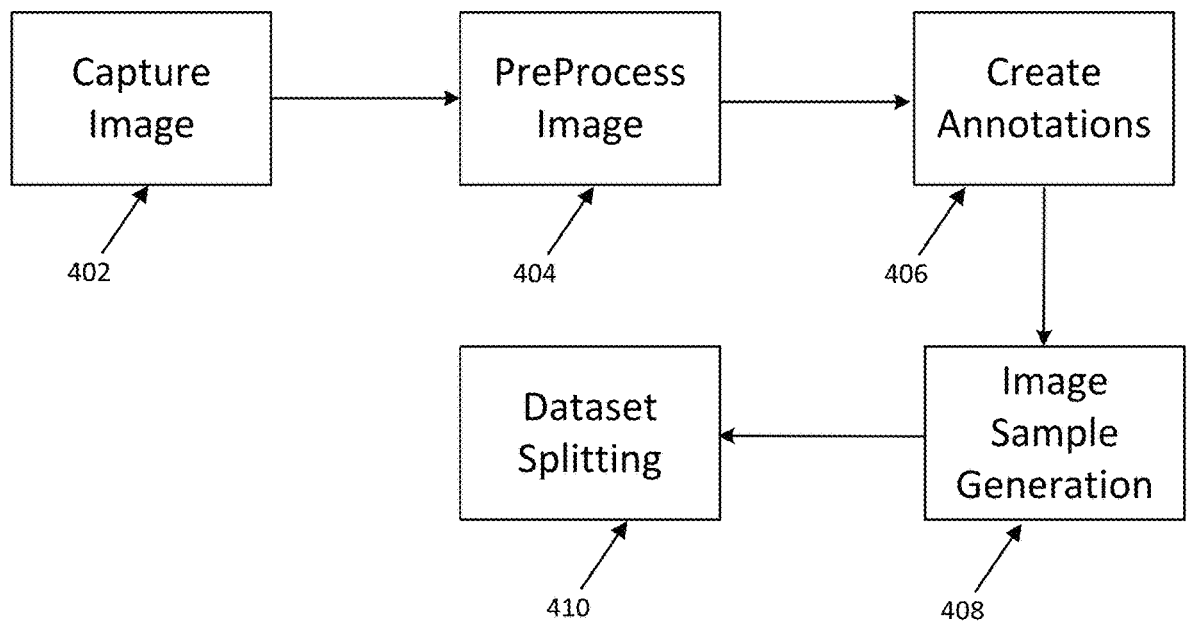
FIG. 4 depicts a schematic representation of a process used to perform pattern analysis on agricultural images.

FIG. 4 depicts a schematic representation of a process used to perform pattern analysis on agricultural images. The image may be captured using any conventional methods of capturing a digital image. In one embodiment, the image is a high resolution raw image. In one embodiment, the image is captured from an aircraft flying at least 1,500 feet above the surface. In step 404, the image analysis unit 114 pre-processes each image. In pre-processing, each image is clipped by a lower bound and an upper bound using the following equations:

$$V_{tower} = \max(0, p5 - 0.4 \times (p5 - p5))$$

$$V_{upper} = \min(255, p95 - 0.4 \times (p5 - p5))$$

Where Vtower and Vupper represent the lower and upper bounds of pixel values and p5 and p95 represent the 5th and 95th percentile respectively.

In one embodiment, the high resolution raw image includes a blue channel, a green channel, a red channel, a red-edge channel and a near-infrared channel In step 406, the annotation unit 116 creates annotations in each image. In step 408, the image analysis unit segments each image into equally sized portions. In one embodiment, each equally sized portion is 512×512 pixels. In one embodiment, if two image portions have an intersection over union of over a predetermined percentage, the portion with the fewest pixels annotated as field patterns are discarded. In step 410, each image is randomly split using a train/val/test ratio. After each image is split, each image is assigned to the split of the raw image the split was cropped from to ensure cropped images for the same portion of land appear in multiple splits.

Figure 5A:
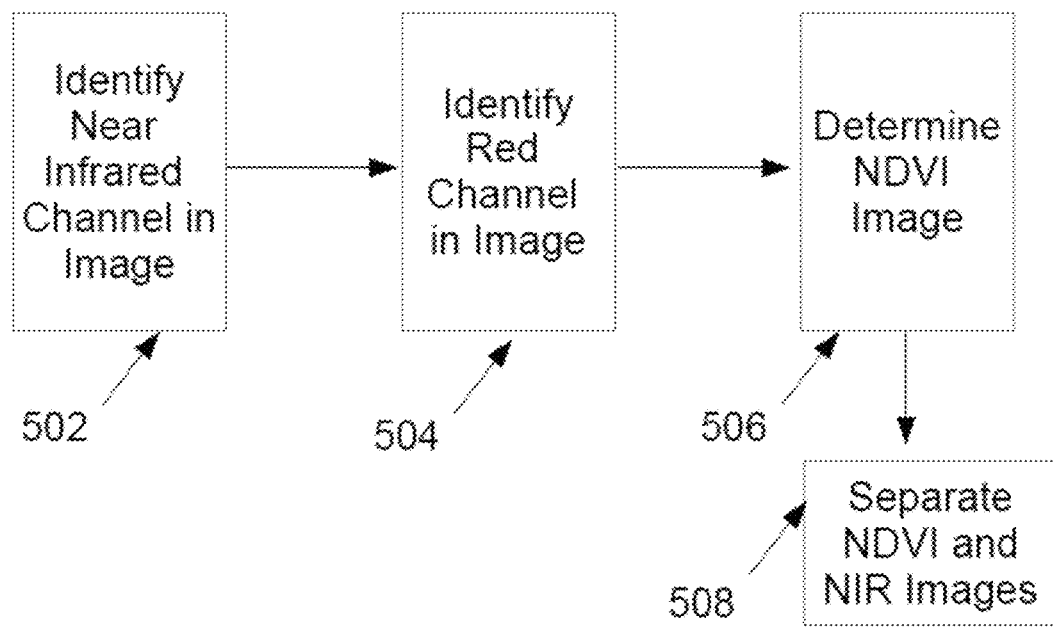
FIG. 5A depicts a schematic representation of a process used to calculate the normalized difference vegetation index (NDVI) for each image.

FIG. 5A depicts a schematic representation of a process used to calculate the normalized difference vegetation index (NDVI) for each image. In step 502, the near field channel is identified in the image by the image analysis unit 114 where the near field channel (NIR) is between 800 nm and 850 nm. In step 504, the red channel is identified in each image by the image analysis unit 114 where the red channel is between 650 nm and 680 nm. In step 506, the NDVI is calculated using the following equation:

$$NDVI = \frac{NIR-RED}{NIR+RED}$$

Figure 5B:
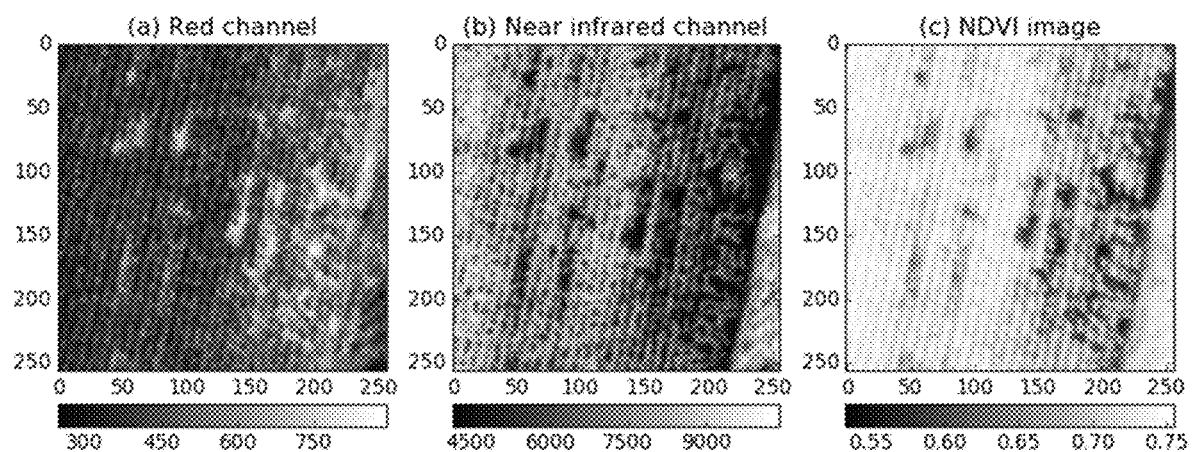
FIG. 5B depicts an example of a red field channel (a), NIR channel (b) and NDVI image (c).

In step 508, the NDVI image and NIR images are separated non-overlapping tiles of equally sized pixels. In one embodiment, each tile is 256×256 pixels. FIG. 5B depicts an example of a red field channel (a), NIR channel (b) and NDVI image (c).

Figure 6:
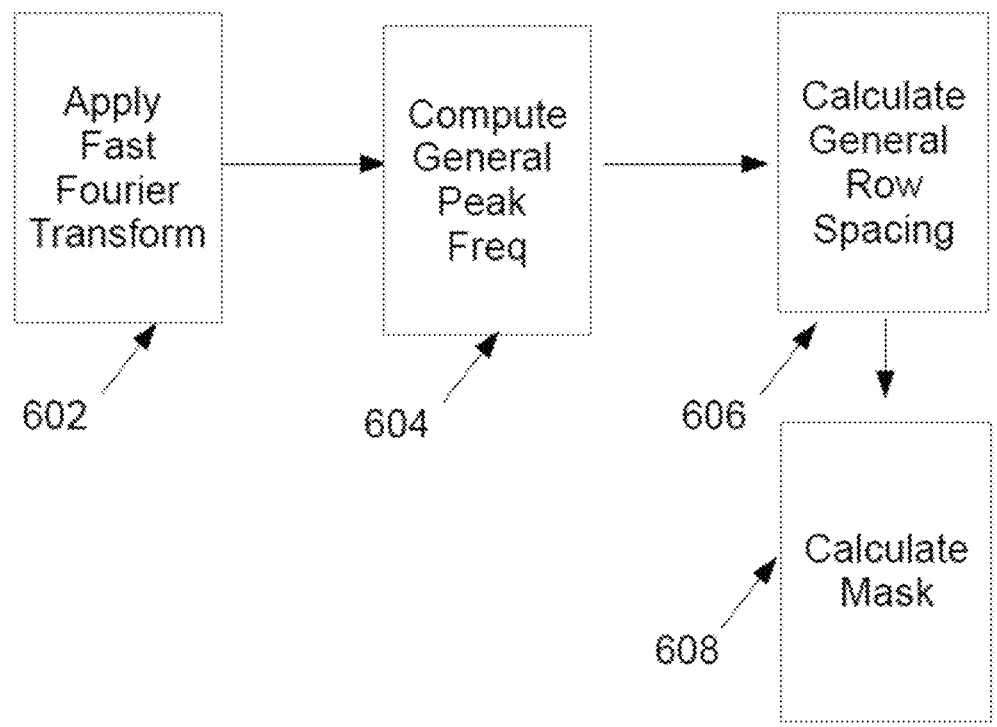
FIG. 6 depicts a method of identifying rows in an image.

FIG. 6 depicts a method of identifying rows in an image. In step 602, a Fast Fourier Transform ("FFT") is applied to each NDVI image. The highest peaks in the FFT spectra (shown in light blue in FIGS. 8A-8C) are symmetrical to the FFT spectra image center and correspond to the lines that best describe the vegetation row. The two dimensional frequency location (x,y) of the peaks relate to the spacing between planted vegetation rows s according to Equation 1 below:

$$s = \frac{w}{\sqrt{\left(\frac{w}{2}-x\right)^2 + \left(\frac{w}{2}-y\right)^2}}$$

Where w is the width of the tile.

In step 604 the general peak frequency is calculated as the median value of all the highest FFT peaks extracted in each of the NDVI tiles. In step 606, the general row spacing between the planted vegetation rows is computed using Equation I above for the general peak frequency.

In step 608, a binary mask of the same size is calculated with the NDVI tile (256×256 pixel in one implementation). The binary mask contains non-zero values only in the circle corresponding to the general peak frequency. In FFT domain this mask will select only peaks that correspond to vegetation rows separated by general row spacing described above.

In one embodiment, a specialized semantic segmentation model is used to identify patterns in each processed image. In one embodiment, the specialized segmentation model is a Feature Pyramid Network (FPN) based model. The specialized FPN model includes an encoder that is a Residual Network (ResNet) where the first three residual blocks are retained and the last residual block is a dilated residual block with a rate of 4. A FPN decoder is implemented using two 3×3 and one 1×1 convolution layer. Each of the two 3×3 layers is followed by a batch normalization layer (BN) and a leaky ReLU activation with a negative slope of 0.01. The last 1×1 convolution layer does not have bias. For upsampling models, a deconvolution layer with a kernel size of 3, stride of 2 and padding of I is used followed by a BN layer and a ReLu activation and another 1×1 convolution layer without bias.

The output from each lateral connection and corresponding upsampling module are added together, the output is then passed through two more 3×3 convolution layers with BN and leaky ReLU. Outputs from all pyramid levels are upsampled to the highest pyramid resolution using bilinear interpolation and are concatenated. The result is passed to a 1×1 convolution layer with bias unit to predict the final semantic map.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed:

1. A pattern recognition system including:
   an image gathering unit that gathers digital at least one representation of a field;
   an image analysis unit that pre-processes the at least one representation of a field using an upper bound and a lower bound;
   an annotation unit that provides a visualization of at least one channel for each of the at least one digital representation of the field; wherein,
   the image analysis unit identifies overlapping regions of adjacent samples and discard the portion of the adjacent samples having the fewest pixels overlapping,
   the each of the samples is 512 pixels by 512 pixels and each of the samples is randomly split using a train, val, test ratio,
   the image analysis unit generates a plurality of image samples from each of the at least one digital representation of the field, and
   the image analysis unit splits each of the image samples into a plurality of categories.

2. The pattern recognition system of claim 1, wherein the annotation unit separates each digital representation into RGB, NIR and NDVI channels.

3. The pattern recognition system of claim 1, wherein a sample is discarded if the sample has more than 30% overlap with an adjacent sample.

4. The pattern recognition system of claim 1, wherein the image analysis unit randomly splits each sample into at least three categories.

5. The pattern recognition system of claim 1, wherein the image analysis unit generates a semantic map by applying a modified FPN model to each image sample.

6. The pattern recognition system of claim 5, wherein the FPN model encoder is a ResNet.

7. The pattern recognition system of claim 6, wherein FPN decoder includes two 3×3 and one 1×1 convolution layer.

8. The pattern recognition system of claim 7, wherein each 3×3 convolution layer includes batch normalization layer and a leaky ReLU layer.

9. The pattern recognition system of claim 8, wherein the batch normalization layer and leaky ReLU layer have a negative slope of 0.1.

10. The pattern recognition system of claim 7, wherein the last convolution layer does not have bias.

11. A method identifying a row in an image, the method including the steps of:
    gathering at least one digital representation of a field via an image gathering unit;
    processing the at least one representation of a field using an upper bound and a lower bound via an image analysis unit;
    generating visualization of at least one channel for each of the at least one digital representation of the field via an annotation unit;
    identifying overlapping regions of adjacent samples and discard the portion of the adjacent samples having the fewest pixels overlapping;

generating a plurality of image samples from each of the at least one digital representation of the field via the image analysis unit; and splitting each of the image samples into a plurality of categories via the image analysis unit, wherein, the each of the samples is 512 pixels by 512 pixels and each of the samples is randomly split using a train, val, test ratio.

12. The method of claim 11, including the step of separating each digital representation into RGB, NIR and NDVI channels via the annotation unit.

13. The method of claim 11, wherein a sample is discarded if the sample has more than 30% overlap with an adjacent sample.

14. The method of claim 11, including the step of randomly splitting each sample into at least three categories via the image analysis unit.

15. The method of claim 11, including the step of generating a semantic map by applying a modified FPN model to each image sample via the image analysis unit.

16. The method of claim 15, wherein the FPN model encoder is a ResNet.

17. The method of claim 16, wherein the FPN decoder includes two 3×3 and one 1×1 convolution layer.

18. The method of claim 17, wherein each 3×3 convolution layer includes batch normalization layer and a leaky ReLU layer.

19. The method of claim 18, wherein the batch normalization layer and leaky ReLU layer have a negative slope of 0.1.

20. The method of claim 17, wherein the last convolution layer does not have bias.

* * * * *